United States Patent
Sakamoto et al.

(10) Patent No.: US 7,947,229 B2
(45) Date of Patent: May 24, 2011

(54) APPARATUS AND METHOD FOR DISSOLUTION REACTION

(75) Inventors: Yukinori Sakamoto, Kumagaya (JP); Shinichiro Saito, Kumagaya (JP); Toshiaki Hirose, Chichibu (JP)

(73) Assignee: Taiheiyo Cement Corporation (JP)

( * ) Notice: Subject to any disclaimer, the term of this patent is extended or adjusted under 35 U.S.C. 154(b) by 350 days.

(21) Appl. No.: 12/064,601

(22) PCT Filed: Aug. 26, 2006

(86) PCT No.: PCT/JP2006/316706
§ 371 (c)(1),
(2), (4) Date: Feb. 26, 2009

(87) PCT Pub. No.: WO2007/023937
PCT Pub. Date: Mar. 1, 2007

(65) Prior Publication Data
US 2010/0006008 A1    Jan. 14, 2010

(30) Foreign Application Priority Data
Aug. 26, 2005    (JP) .................... 2005-245393

(51) Int. Cl.
*B01J 10/00* (2006.01)
*C04B 14/00* (2006.01)

(52) U.S. Cl. ....... 422/129; 422/187; 106/38.2; 106/705; 106/707; 106/405

(58) Field of Classification Search ............ 422/129, 422/187; 106/38.2, 705, 707, 405
See application file for complete search history.

(56) References Cited

U.S. PATENT DOCUMENTS
4,150,096 A * 4/1979 Nelms et al. ............ 423/243.1
(Continued)

FOREIGN PATENT DOCUMENTS
EP    1219336    7/2002
(Continued)

OTHER PUBLICATIONS
Toshiaki Murata, "Coal Preparation Technology for Moderation of Environmental Pollution," Journal "Doryoku (Power)" No. 248 extra issue, 1998.
(Continued)

*Primary Examiner* — Walter D Griffin
*Assistant Examiner* — Huy-Tram Nguyen
(74) *Attorney, Agent, or Firm* — Stetina Brunda Garred & Brucker

(57) ABSTRACT

When fly ash is added to a cement kiln to materialize it after being desalinated by washing, scale is prevented from growing in a dissolution reaction apparatus depositing calcium-containing compounds dissolved in slurry, and the fly ash is effectively used as a cement material. A dissolution reaction apparatus according to the invention comprises: a dissolution tub 3 for dissolving powder material, a wet dust collector 5 for collecting powder material and mist while reacting slurry S in the dissolution tub 3 with gas G and returning the collected powder material and mist to the dissolution tub 3. A second wet dust collector 7 can be provided for collecting powder material and the like accompanying to the gas G discharged from the wet dust collector 5, and both the wet dust collectors 5, 7 can be vertical type and mounted independently with each other on the dissolution tub 3. The slurry S and the gas G can react with each other with parallel flow by feeding the slurry S and the gas G to an upper portion of the first wet dust collector 5, or the powder material and the like accompanying to the gas G may be collected with counter flow by feeding the gas G discharged from the dissolution tub 3 to a lower portion of the second wet dust collector 7.

19 Claims, 2 Drawing Sheets

U.S. PATENT DOCUMENTS

| | | | | |
|---|---|---|---|---|
| 4,228,139 | A * | 10/1980 | Johnson | 423/243.1 |
| 7,037,434 | B2 * | 5/2006 | Myers et al. | 210/718 |
| 2002/0083831 | A1 * | 7/2002 | Jorget et al. | 95/57 |
| 2004/0118783 | A1 * | 6/2004 | Myers et al. | 210/718 |
| 2007/0014712 | A1 * | 1/2007 | Pehkohen et al. | 423/244.07 |
| 2007/0086930 | A1 * | 4/2007 | Saito | 422/168 |

FOREIGN PATENT DOCUMENTS

| | | |
|---|---|---|
| JP | 5344472 | 4/1978 |
| JP | 5386720 | 7/1978 |
| JP | 61025651 | 4/1986 |
| JP | 61103992 | 5/1986 |
| JP | 61106698 | 5/1986 |
| JP | 2116649 | 5/1990 |
| JP | 3221147 | 9/1991 |
| JP | 044032 | 8/1992 |
| JP | 5238788 | 9/1993 |
| JP | 5293385 | 11/1993 |
| JP | 6157089 | 6/1994 |
| JP | 6335700 | 6/1994 |
| JP | 06063335 | 8/1994 |
| JP | 775720 | 3/1995 |
| JP | 7204604 | 8/1995 |
| JP | 7213950 | 9/1995 |
| JP | 7299331 | 11/1995 |
| JP | 8108038 | 4/1996 |
| JP | 08057351 | 5/1996 |
| JP | 09225441 | 2/1997 |
| JP | 9227184 | 9/1997 |
| JP | 09295841 | 11/1997 |
| JP | 9301751 | 11/1997 |
| JP | 10230137 | 9/1998 |
| JP | 11010131 | 1/1999 |
| JP | 11100243 | 4/1999 |
| JP | 11244826 | 9/1999 |
| JP | 11347548 | 12/1999 |
| JP | 200024625 | 1/2000 |
| JP | 2000146458 | 5/2000 |
| JP | 2001198434 | 7/2001 |
| JP | 2002180146 | 6/2002 |
| JP | 2002219335 | 8/2002 |
| JP | 2002282639 | 10/2002 |
| JP | 2002355531 | 12/2002 |
| JP | 2003266057 | 9/2003 |
| JP | 2003284973 | 10/2003 |
| JP | 200466229 | 4/2004 |
| JP | 2004313833 | 11/2004 |
| JP | 2005104792 | 4/2005 |
| WO | WO2004/052801 | 6/2004 |
| WO | WO 2005023397 A1 * | 3/2005 |

OTHER PUBLICATIONS

Mitsui Engineering & Shipbuilding Co., Ltd., "De-Ashing and De-Sulfurizing Equipment Based on M-COL Technology," Journal, No. 154, 1995.

Mitsui Engineering & Shipbuilding Co., Ltd., "Fine M-COL," Journal, No. 170, 2000.

Mitsui Engineering & Shipbuilding Co., Ltd., "Development of Clean Coal Fuel (M-COL) System," Journal, No. 171, 2000.

Nishitani, Takashi, "A Basic Experiment on the Mercury Removal in Exhaust Gases from Municipal Refuse Incinerator," Osaka City Institute of Public Health and Environmental Sciences, Annual Report No. 51, 1988.

* cited by examiner

APPARATUS AND METHOD FOR DISSOLUTION REACTION

CROSS-REFERENCE TO RELATED APPLICATIONS

The present application claims priority to International Application No. PCT/JP2006/316706 which was filed on Aug. 26, 2006 and claims priority to Japanese Patent Application No. 2005-245393 filed Aug. 26, 2005.

STATEMENT RE: FEDERALLY SPONSORED RESEARCH/DEVELOPMENT

Not Applicable

BACKGROUND OF THE INVENTION

1. Technical Field of the Invention

The present invention relates to an apparatus and a method for dissolution reaction that can, for instance, prevent growing of scale in devices and effectively use slurried fly ash as a cement material.

2. Description of the Related Art

Fly ash generated at incineration facilities and the like is added to cement kilns as slurry after desalinated through washing since chlorine included in the fly ash is an obstacle when used as a cement material.

However since the slurry in which the fly ash dissolves includes calcium-containing compounds such as calcium hydroxide, scale grows in pipes for transporting the slurry and the like, which necessitates regular removal of the scale sticking to the pipes and the like, and becomes a great factor to lower the operation rate of devices for materializing the fly ash.

To solve the above problem, for instance, in the first patent document, a technology is described. In this technology, when exhaust gas including carbon dioxide for neutralization is blown through a blowing nozzle to a fly ash detoxification tank which accommodates water in which the fly ash dissolves, in order to prevent clogging of the exhaust-gas-blowing nozzle, which is caused by sticking of scale of calcium carbonate thereto, the calcium carbonate generated by neutralization is concentrated, and is circulated again as seed crystals from a seed crystal returning pipe to the fly ash detoxification tank.

Further, in the second patent document, a method effective to prevent growing of scale is described. In this method, carbon dioxide is blown to slurry in which fly ash dissolves, which causes calcium-containing compounds dissolved in the slurry to be separated out. In addition, a diffusion plate for blowing the carbon dioxide is disclosed. The diffusion plate is made of rubber with elasticity, and the plate keeps plane shape before gas is blown, and expands outward after the blowing.

Patent document 1: Japanese Patent Publication Heisei 8-108038 gazette

Patent document 2: International Patent Publication WO 2004/030839 gazette

BRIEF SUMMARY OF THE INVENTION

In the method for neutralizing fly ash with exhaust gas described in the first patent document, however, even if the clogging of the blowing nozzle caused by growing of the calcium carbonate scale could be prevented, it is necessary to install another facility for concentrating the calcium carbonate, and circulating it again as seed crystals from the seed crystal returning pipe to the fly ash detoxification tank.

Meanwhile, in the method and device described in the second patent document for treating powder material including calcium, even if the diffusion plate with the above construction is used, for example, deposits frequently blockade the plate due to stiffening of rubber with initial elasticity. As a result, instead of cleaning the pipe for transporting the slurry and the like, cleaning work for the diffusion device is increased.

The present invention has been made in consideration of the above problems in the conventional techniques, and the object thereof is to provide an apparatus and a method for dissolution reaction that are able to, when fly ash generated at incineration facilities and the like is desalinated through washing and is materialized by adding as slurry to cement kilns, prevent growing of scale in the dissolution reaction apparatus for separating calcium-containing compounds dissolved in the slurry, and effectively and stably use the fly ash as a cement material, and so on.

To achieve the above object, a dissolution reaction apparatus according to the present invention is characterized to have a dissolution tub for dissolving powder material, and a wet dust collector for collecting powder material and mist while reacting slurry in the dissolution tub with gas and returning the collected powder material and mist to the dissolution tub.

With the present invention, since the wet dust collector collects the powder material and the mist while making the slurry in the dissolution tub react with the gas, growing of the scale in the dissolution tub can be prevented. In addition, the powder material and the mist can be collected before the scale grows in the wet dust collector, so that the growing of the scale can be prevented in the wet dust collector also, and stable operation of the wet dust collector can be continued for a long period of time.

In the above dissolution reaction apparatus, a second wet dust collector can be installed to collect powder material and mist accompanying to gas discharged from the wet dust collector. With the second wet dust collector, an operation barrier due to scale that may be generated from the powder material and the mist discharged from the first wet dust collector can be removed.

In addition, in the above dissolution reaction apparatus, it is possible that the first and second wet dust collectors are vertical type; both of them are independently mounted on the dissolution tub; the slurry and the gas react with each other with parallel flow by feeding them to an upper portion of the first wet dust collector; and the powder material and the mist accompanying to the gas are collected with counter flow by feeding the gas discharged from the dissolution tub to a lower portion of the second wet dust collector.

Further, in the above dissolution reaction apparatus, it is possible that the first and second wet dust collectors are vertical type, and both of them are mounted in series on the dissolution tub with the first wet dust collector below the second wet dust collector, and the slurry and the gas react with each other with counter flow by feeding the slurry to an upper portion, and the gas to a lower portion of the first wet dust collector, and the powder material and the mist accompanying to the gas are collected with counter flow by feeding the gas discharged from the first wet dust collector to a lower portion of the second wet dust collector.

In the above dissolution reaction apparatus, the powder material may include calcium-containing components, and the gas can be combustion exhaust gas including carbon dioxide. With these, calcium carbonate is separated out in the dissolution reaction apparatus, and it is possible to prevent growing of scale in pipes for transporting the slurry and the like downstream of the dissolution reaction apparatus, and the apparatus is preferably used, for example, to effectively use slurry and the like obtained by washing fly ash as a cement raw material.

In the above dissolution reaction apparatus, the powder material can be fly ash generated by burning municipal waste; filtrate of liquid generated after washing in a washing-desalinating device for burnt fly ash can be used for the second wet dust collector; and the gas that reacts with the slurry can be cement kiln exhaust gas. With carbon dioxide included in cement kiln exhaust gas, calcium-containing compounds included in the fly ash, which is generated by burning municipal waste, is separated out as calcium carbonate, and it is possible to prevent the growing of scale in the washing facilities and the like downstream of the dissolution reaction apparatus, and the slurry obtained by washing the fly ash generated by burning municipal waste can effectively be used as a cement material.

In addition, in the above dissolution reaction apparatus, the first and second wet dust collectors can be mixing-type scrubbers. With the high-efficiency scrubbers such as mixing-type scrubbers, growing of scale in the wet dust collectors can be prevented more effectively.

Further, dissolution reaction method according to the present invention is characterized to comprise the steps of collecting powder material and mist while reacting slurry in a dissolution tub with gas, and returning the collected powder material and mist to the dissolution tub. With this method, as described above, growing of the scale in the dissolution tub can be prevented. In addition, in the dust collection process also, the powder material and the mist can be collected before the scale grows, so that the growing of the scale can be prevented, and stable operation can be continued for a long period of time.

As described above, with the dissolution reaction apparatus and the method according to the present invention, when fly ash generated from incineration facilities or the like is desalinated through washing and is materialized by adding as slurry to cement kilns etc., it is possible to prevent growing of scale in slurry transportation pipes and in a dissolution reaction apparatus for separating calcium-containing compounds dissolved in the slurry, and effectively and stably use the fly ash as a cement material, and so on.

DETAILED DESCRIPTION OF THE INVENTION

Figure 1:
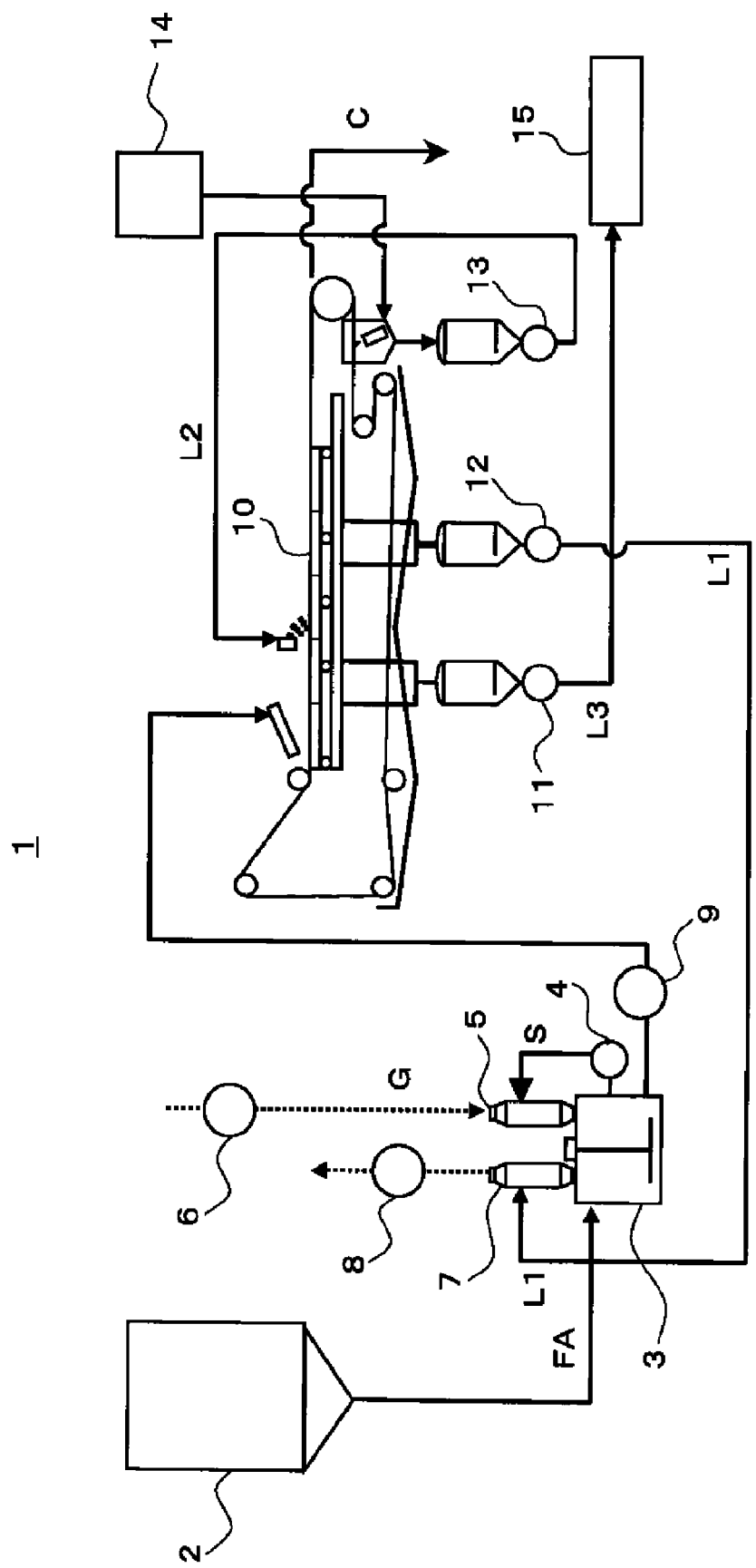
FIG. 1 is a flowchart showing the fly ash washing facility with the dissolution reaction apparatus according to the first embodiment of the present invention.

FIG. 1 shows a fly ash washing facility with a dissolution reaction apparatus according to the first embodiment of the present invention, the fly ash washing facility 1 roughly comprises a fly ash receiving tank 2, a dissolution tub 3, the first and the second wet dust collectors 5, 7, and a belt filter 10. The dissolution tub 3, and the first and second wet dust collectors 5, 7 compose the dissolution reaction apparatus.

The fly ash receiving tank 2 is installed to temporarily store the fly ash generated in incineration facilities or the like, the fly ash stored in the fly ash receiving tank 2 is fed to the dissolution tub 3 by a feeding device not shown.

The dissolution tub 3 is installed to dissolve fly ash FA fed from the fly ash receiving tank 2 into filtrate L1 of liquid generated after washing in the belt filter 10 described below. With this, water-soluble chlorine-containing compounds included in the fly ash FA dissolve into the filtrate L1 of liquid generated after washing.

The first wet dust collector 5 is installed to react slurry S, which is fed through a pump 4 from the dissolution tub 3, and kiln exhaust gas G, which is fed through a blower 6 and includes carbon dioxide with each other, and to separate calcium-containing compounds dissolved in the slurry S as calcium carbonate, and to instantly collect the separated calcium carbonate and return it to the dissolution tub 3.

The second wet dust collector 7 is installed to collect powder material and mist accompanying to the kiln exhaust gas G discharged from the dissolution tub 3. The filtrate L1 of liquid generated after washing in the belt filter 10 and the kiln exhaust gas G are contacted with counter flow in the second wet dust collector 7.

As these wet dust collectors 5, 7, for example, a mixing scrubber (Mu scrubber manufactured by MU COMPANY LTD. etc.) may be used. The mixing scrubber is characterized in that plurality of guide vanes are installed to a cylindrical body to swirl flows of gas and liquid that move in the cylindrical body in opposite directions with each other or in the same direction to contact gas and liquid with each other for reaction between them, dust collection, and so on. Preferably, the gas and the liquid flow in the same direction, and guide vanes giving right turning to the flows and those giving left turning to the flows are installed in turn.

The belt filter 10 is installed to solid/liquid separate the slurry S that is fed through a pump 9 from the dissolution tub 3. Below the belt filter 10 are installed a pump 11 for sending mother filtrate L3 to a drainage processing system 15, and a pump 12 for sending the filtrate L1 of liquid generated after washing to the second wet dust collector 7, and a pump 13 for utilizing hot water from a hot water tub 14 as water L2 for washing a cake.

Next, the motion of the fly ash washing facility 1 with the above-mentioned construction will be explained.

Fly ash generated in incineration facilities or the like is temporarily stored to the fly ash receiving tank 2, and is fed to the dissolution tub 3 by a feeder not shown. In the dissolution tub 3, the filtrate L1 of liquid generated after washing from the belt filter 10 is fed through the second wet dust collector 7 and water-soluble chlorine-containing compounds included in the fly ash FA is dissolved in the dissolution tub 3.

The slurry S in the dissolution tub 3, which is made from the fly ash FA and the filtrate L1 of liquid generated after washing is circulated through the pump 4 and the first wet dust collector 5. In the first wet dust collector 5, the slurry S and the kiln exhaust gas G from the blower 6 react with each other, calcium carbonate is separated out by reacting the carbon dioxide in the kiln exhaust gas G and the calcium-containing compounds dissolved into slurry S with each other. The calcium carbonate is collected by the first wet dust collector 5 the moment it is separated out, and is returned to the dissolution tub 3. In this connection, the carbon dioxide is hard to effectively melt into the slurry S when the temperature of the slurry S in the dissolution tub 3 is high, so that it is preferable to adjust the temperature 40 or below.

The kiln exhaust gas G introduced through the first wet dust collector 5 to the dissolution tub 3 is led to the second wet dust collector 7, and contacts, with counter flow, with the filtrate L1 of liquid generated after washing in the belt filter 10, which allows the powder material and the mist accompanying to the kiln exhaust gas G to be collected. And then, the kiln exhaust gas G is released in the air through the fan 8.

Meanwhile, the slurry S in the dissolution tub 3 is transported through the pump 9 to the belt filter 10, and is solid/liquid separated while being washed with the water L2 for washing cake fed through the pump 13 from hot water tub 14. In the belt filter 10, cake C of which chlorine-containing compounds are removed is transported to a cement kiln etc. so as to be used as a cement raw material. On the other hand, the mother filtrate L3 is transported through the pump 11 to the drainage processing system 15, and is treated therein. The filtrate L1 of liquid obtained after washing the slurry S is returned through the pump 12 to the second wet dust collector 7. In case that the separated calcium carbonate is so fine that it becomes an obstacle at the solid/liquid separation in the belt filter 10, it is preferable to add aggregating agent in the dissolution tub 3.

Figure 2:
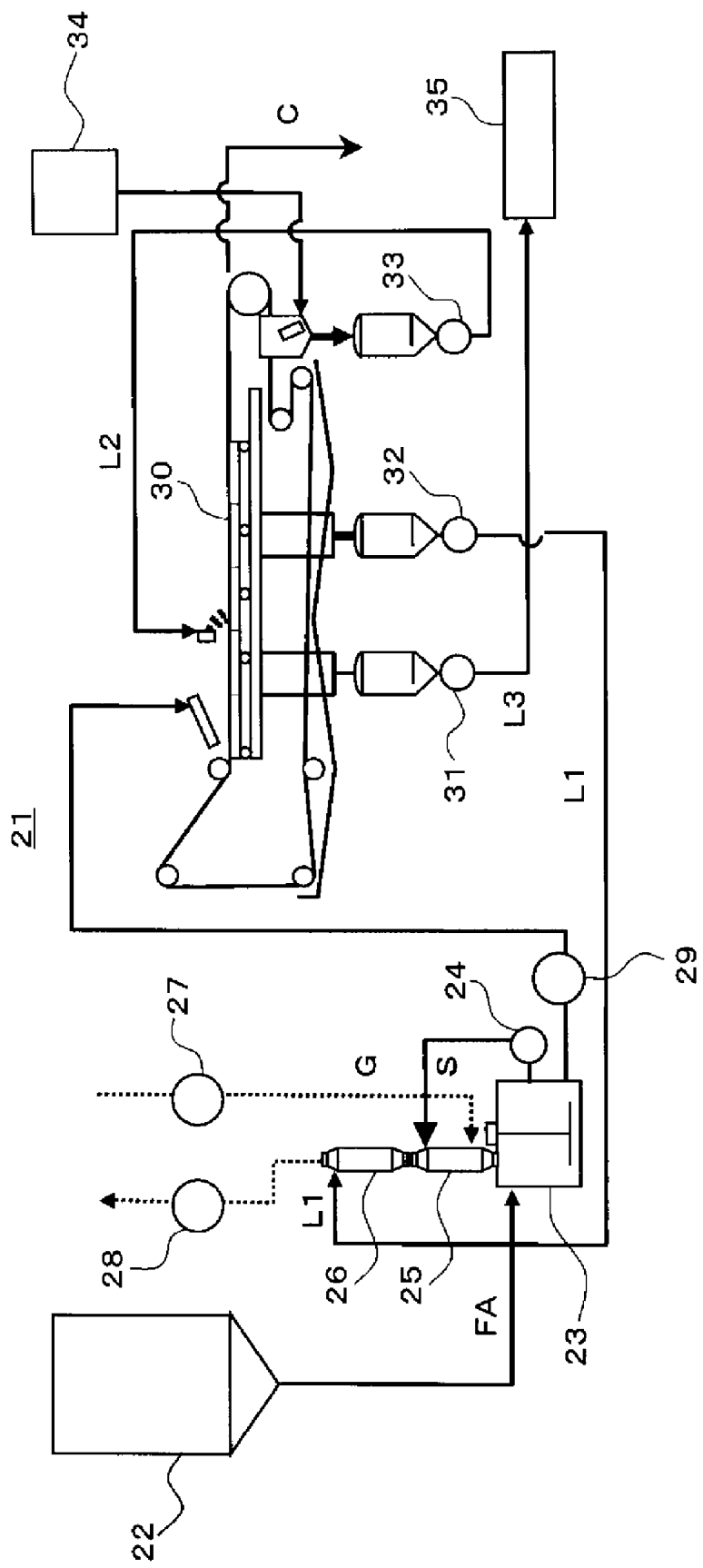
FIG. 2 is a flowchart showing the fly ash washing facility with the dissolution reaction apparatus according to the second embodiment of the present invention.

Next, a fly ash washing facility with a dissolution reaction apparatus according to the second embodiment of the present invention is explained while referring to FIG. 2. The fly ash washing facility 21 roughly comprises a fly ash receiving tank 22, a dissolution tub 23, the first and second dust collectors 25, 26, and a belt filter 30. The dissolution tub 23, and the first and second wet dust collectors 25, 26 compose the dissolution reaction apparatus.

The constructions of the fly ash receiving tank 22, the first and second dust collectors 25, 26, and the belt filter 30 are the same as these of the fly ash receiving tank 2, the first and second wet dust collectors 5, 7, and the belt filter 10 in FIG. 1 respectively, so that detailed explanation thereof will be omitted. This embodiment is characterized by vertically arranging the first and second dust collectors 25, 26 in series on the dissolution tub 23.

Next, the motion of the fly ash washing facility 21 with the above-mentioned construction will be explained.

Fly ash generated at incineration facilities or the like is temporarily stored to the fly ash receiving tank 22, and is fed to the dissolution tub 23 by a feeder not shown. In the dissolution tub 23, the filtrate L1 of liquid generated after washing from the belt filter 30 is fed through the first and second wet dust collectors 25, 26 and water-soluble chlorine-containing compounds included in the fly ash FA are dissolved in the dissolution tub 23.

The slurry S in the dissolution tub 23, which is made from the fly ash FA and the filtrate L1 of liquid generated after washing is circulated through the pump 24 and the first wet dust collector 25. In the first wet dust collector 25, the slurry S and the kiln exhaust gas G from the blower 27 react with each other, and the calcium carbonate is separated out by reacting the carbon dioxide in the kiln exhaust gas G with the calcium-containing compounds dissolved into the slurry S. The calcium carbonate is collected by the first wet dust collector 25 the moment it is separated out, and is returned to the dissolution tub 23. In this connection, the carbon dioxide is hard to effectively melt into the slurry S when temperature of the slurry S in the dissolution tub 23 is high, so that it is preferable to adjust the temperature 40 or below.

The kiln exhaust gas G introduced through the first wet dust collector 25 to the second wet dust collector 26, contacts, with counter flow, with the filtrate L1 of liquid generated after washing in the belt filter 30, which allows the powder material and the mist accompanying to the kiln exhaust gas G to be collected. And then, the kiln exhaust gas G is exhausted through the fan 28.

Meanwhile, the slurry S in the dissolution tub 23 is transported through the pump 29 to the belt filter 30, and is solid/liquid separated while being washed with the water L2 for washing cake fed through the pump 33 from hot water tub 34. In the belt filter 30, cake C of which chlorine-containing compounds are removed is transported to a cement kiln etc. so as to be used as a cement raw material, on the other hand, the mother filtrate L3 is transported through the pump 31 to the drainage processing system 35 and is treated therein. The filtrate L1 of liquid obtained after washing the slurry S is returned through the pump 32 to the second wet dust collector 26. In case that the separated calcium carbonate is so fine that it becomes an obstacle at solid/liquid separation in the belt filter 30, it is preferable to add aggregating agent in the dissolution tub 23.

Explanation of Signals
1 fly ash washing facility
2 fly ash receiving tank
3 dissolution tub
4 pump
5 first wet dust collector
6 blower
7 second wet dust collector
8 fan
9 pump
10 belt filter
11 pump
12 pump
13 pump
14 hot water tub
15 drainage processing system
21 fly ash washing facility
22 fly ash receiving tank
23 dissolution tub
24 pump
25 first wet dust collector
26 second wet dust collector
27 blower
28 fan
29 pump
30 belt filter
31 pump
32 pump
33 pump
34 hot water tub
35 drainage processing system This disclosure provides exemplary embodiments of the present invention. The scope of the present invention is not limited by these exemplary embodiments. Numerous variations, whether explicitly provided for by the specification or implied by the specification, such as variations in structure, dimension, type of material and manufacturing process, may be implemented by one skilled in the art in view of this disclosure.

The invention claimed is:

1. A dissolution reaction apparatus comprising:
    a dissolution tub for dissolving powder material; and
    a wet dust collector for collecting powder material and mist while reacting slurry in said dissolution tub with gas and returning said collected powder material and mist to the dissolution tub.

2. The dissolution reaction apparatus as claimed in claim 1, further comprising a second wet dust collector for collecting powder material and mist accompanying to gas discharged from said wet dust collector.

3. The dissolution reaction apparatus as claimed in claim 2, wherein said first and second wet dust collectors are vertical type;
    both of the wet dust collectors are independently mounted with each other on the dissolution tub;

the slurry and the gas react with each other with parallel flow by feeding the slurry and the gas to an upper portion of the first wet dust collector; and the powder material and the mist accompanying to the gas are collected with counter flow by feeding the gas discharged from the dissolution tub to a lower portion of the second wet dust collector.

4. The dissolution reaction apparatus as claimed in claim 3, wherein said powder material contains calcium; and said gas is a combustion exhaust gas containing carbon dioxide.

5. The dissolution reaction apparatus as claimed in claim 4, wherein said powder material is a fly ash generated by burning municipal waste;

filtrate of liquid generated after washing in a washing-desalinating device for burnt fly ash is used for the second wet dust collector; and said gas that reacts with the slurry is a cement kiln exhaust gas.

6. The dissolution reaction apparatus as claimed in claim 3, wherein at least one of said first wet dust collector and said second wet dust collector is a mixing-type scrubber.

7. The dissolution reaction apparatus as claimed in claim 2, wherein said first and second wet dust collectors are vertical type;

both of the wet dust collectors are mounted in series on the dissolution tub with the first wet dust collector below the second wet dust collector;

the slurry and the gas react with each other with counter flow by feeding the slurry to an upper portion, and the gas to a lower portion of the first wet dust collector; and the powder material and the mist accompanying to the gas are collected with counter flow by feeding the gas discharged from the first wet dust collector to a lower portion of the second wet dust collector.

8. The dissolution reaction apparatus as claimed in claim 7, wherein said powder material contains calcium; and said gas is a combustion exhaust gas containing carbon dioxide.

9. The dissolution reaction apparatus as claimed in claim 8, wherein said powder material is a fly ash generated by burning municipal waste;

filtrate of liquid generated after washing in a washing-desalinating device for burnt fly ash is used for the second wet dust collector; and said gas that reacts with the slurry is a cement kiln exhaust gas.

10. The dissolution reaction apparatus as claimed in claim 7, wherein at least one of said first wet dust collector and said second wet dust collector is a mixing-type scrubber.

11. The dissolution reaction apparatus as claimed in claim 2, wherein said powder material contains calcium; and said gas is a combustion exhaust gas containing carbon dioxide.

12. The dissolution reaction apparatus as claimed in claim 11, wherein said powder material is a fly ash generated by burning municipal waste;

filtrate of liquid generated after washing in a washing-desalinating device for burnt fly ash is used for the second wet dust collector; and said gas that reacts with the slurry is a cement kiln exhaust gas.

13. The dissolution reaction apparatus as claimed in claim 2, wherein at least one of said first wet dust collector and said second wet dust collector is a mixing-type scrubber.

14. The dissolution reaction apparatus as claimed in claim 1, wherein said powder material contains calcium; and said gas is a combustion exhaust gas containing carbon dioxide.

15. The dissolution reaction apparatus as claimed in claim 14, wherein said powder material is a fly ash generated by burning municipal waste;

filtrate of liquid generated after washing in a washing-desalinating device for burnt fly ash is used for the second wet dust collector; and said gas that reacts with the slurry is a cement kiln exhaust gas.

16. The dissolution reaction apparatus as claimed in claim 15, wherein at least one of said first wet dust collector and said second wet dust collector is a mixing-type scrubber.

17. The dissolution reaction apparatus as claimed in claim 14, wherein at least one of said first wet dust collector and said second wet dust collector is a mixing-type scrubber.

18. The dissolution reaction apparatus as claimed in claim 1, wherein at least one of said first wet dust collector and said second wet dust collector is a mixing-type scrubber.

19. A dissolution reaction method comprising the steps of:

collecting powder material and mist while reacting slurry in a dissolution tub with gas; and returning said collected powder material and mist to the dissolution tub.

* * * * *